US010562788B1

(12) United States Patent
Lesage

(10) Patent No.: US 10,562,788 B1
(45) Date of Patent: Feb. 18, 2020

(54) METHOD AND APPARATUS FOR PREVENTING BACTERIA PROLIFERATION IN AN ELECTRIC WATER HEATER

(71) Applicant: MICLAU-S.R.I. INC., Montreal-East (CA)

(72) Inventor: Jean-Claude Lesage, Kirkland (CA)

(73) Assignee: MICLAU-S.R.l. INC., Montreal, QC (CA)

( * ) Notice: Subject to any disclaimer, the term of this patent is extended or adjusted under 35 U.S.C. 154(b) by 0 days.

(21) Appl. No.: 16/602,362

(22) Filed: Sep. 24, 2019

Related U.S. Application Data

(62) Division of application No. 15/731,021, filed on Apr. 10, 2017, now Pat. No. 10,501,338.

(51) Int. Cl.
*C02F 1/02* (2006.01)
*F24H 1/20* (2006.01)
*F24H 9/14* (2006.01)

(52) U.S. Cl.
CPC ............... *C02F 1/02* (2013.01); *F24H 1/202* (2013.01); *F24H 9/14* (2013.01); *C02F 2209/02* (2013.01); *C02F 2301/046* (2013.01); *C02F 2303/04* (2013.01); *C02F 2307/12* (2013.01)

(58) Field of Classification Search
None
See application file for complete search history.

(56) References Cited

U.S. PATENT DOCUMENTS 5,168,546 A * 12/1992 Laperriere .......... F24D 17/0073
122/14.22
2004/0112844 A1 * 6/2004 Rawson .................... C02F 1/74
210/758

* cited by examiner

*Primary Examiner* — Richard C Gurtowski
(74) *Attorney, Agent, or Firm* — Guy J. Houle; Houle Patent Agency Inc.

(57) ABSTRACT

A method and an apparatus is described for preventing bacteria proliferation in a bottom end of a water holding tank of an electric water heater. Different water convection devices are described for convecting heated water from inside the tank and into the bottom end of the tank to raise the temperature at the bottom end sufficiently high to prevent bacteria growth and particularly at a temperature of at least 46 degrees C. where the *Legionella* bacteria can not survive. The temperature at the bottom end of the tank is monitored and the convection devices controlled to maintain the desired hot water temperature. An added benefit of the invention is that it also prevents sediment deposits and water temperature stratification in the tank bottom end section.

3 Claims, 3 Drawing Sheets

METHOD AND APPARATUS FOR PREVENTING BACTERIA PROLIFERATION IN AN ELECTRIC WATER HEATER

This is a divisional application of U.S. patent application Ser. No. 15/731,021 filed on Apr. 10, 2017 and entitled Method And Apparatus For Preventing Bacteria Proliferation In An Electric Water Heater

FIELD OF THE INVENTION

The present invention relates to a method and apparatus for preventing bacteria proliferation, and particularly but not exclusively, the *Legionella* bacteria, in an electric water heater by the use of heated water within the tank of the water heater at a temperature sufficiently high to kill the bacteria.

BACKGROUND OF THE INVENTION

Although some species of *Legionella* bacteria can be found in the soil, most species live in water that is stagnant and wherein such bacteria survive under a wide range of temperatures, typically 20 to 45 degrees C. According to the Centers for Disease Control and Prevention, USA, between 8,000 and 18,000 people are hospitalized with Legionnaires disease each year. It is of great public concern as its fatality rate during an outbreak ranges from 5% to 30% in those who contract the disease. Actively managing the risk of *Legionella* in water systems is more cost effective than responding to an outbreak. Outbreaks of *Legionella pneumophila* can stem from showers and potable water systems. As water from such sources aerosolized, individuals can inhale the *Legionella* containing droplets and the organism is aspirated into the lungs.

The formation and multiplication of such *Legionella* bacteria is not only promoted by the temperature in the customary hot water systems, but also by the fact that dead spaces are present in such water distribution systems in which deposits and sediment formation can arise, and typically in the bottom zone of water heater tanks. Deposits therein can represent a culture medium for bacteria proliferation.

Most electric water heaters for domestic use have its water tank constructed with a dome shaped bottom wall. Such dome-shaped bottom walls form a surrounding cavitated zone about the dome-shaped wall where sediments deposit can gather and where water is less agitated. This cavitated zone is spaced from the bottom heating element and thus water therein is less hot creating an ideal location for bacterial proliferation. Should the bottom element fail, then the water temperature at the bottom of the tank will drop. It as also been determined by research that the *Legionella* bacteria does not survive at temperatures above 46 degrees C. When hot water is not drawn from a water heater, the water inside the tank becomes stagnant and the water temperature stratifies with the cooler temperature being at the bottom region of the tank. Water within the cavitated zone below the bottom element of the tank can fall to about 30 to 40 degrees C. which is favourable to bacteria growth. Lowering the bottom element to place it close to the bottom wall of the tank has not proven to be a viable solution.

Reference is made to U.S. Pat. Nos. 4,940,024; 5,168,546 and 5,808,277 which disclose various methods and apparatus to prevent bacteria proliferation in electric water heaters. One method teaches adding a heating element in the form of a belt or patch on the outside of the tank against the bottom end of the outer sidewall of the tank to heat the water at the bottom end of the tank to a temperature preferably above 55 degrees C. Accordingly, this proposed solution provides an extra heating element in the form of a patch heater located in an area which is usually filled with insulating foam material and not practical to access should it fail and require replacement or repair. It is also costly and consumes more electricity. In U.S. Pat. No. 5,808,277 a third element is added into the tank to periodically raise the water temperature at the bottom of the tank beyond the pre-set consumption temperature, to a sanitizing temperature to destroy bacteria. This is also a costly proposition. U.S. Pat. No. 4,940,024 discloses a method of directing the cold water flow of all consumed drinking or domestically used water through the lower region of the tank wherein there is no stagnant water and wherein no deposits can be formed for bacteria growth. Accordingly, the lower region of the tank is continuously flushed with fresh water. This is a costly solution requiring a new tank design and cold water conduit network and therefore not a viable solution.

SUMMARY OF THE INVENTION

It is a feature of the present invention to provide a method and apparatus for the prevention of the *Legionella* bacteria in an electric water heater which is different from the known prior art and which uses heated water within the water tank to elevate the temperature of the water in the lower region of the tank sufficiently high to kill and prevent proliferation of bacteria.

Another feature of the present invention is to provide a pump, a water temperature sensor and a control to pump hot water from the upper region of the tank to the bottom end to maintain the temperature in the bottom end of the tank of an electric water heater at a temperature sufficient to kill and prevent proliferation of the *Legionella* bacteria while simultaneously preventing temperature stratification in the lower region of the tank.

A further feature of the present invention is to provide a baffle plate combined with the bottom electrical resistive heating element of an electric water heater to prevent the proliferation of the *Legionella* bacteria in the bottom end of the tank.

A still further feature of the present invention is to pump hot water from the upper region of the tank of an electrical water heater and to release it in the immediate area of the bottom wall of the tank to raise the temperature of the water above 46 degrees C. whereby to kill bacteria.

According to the above features, from a broad aspect, the present invention provides an electric water heater comprising a tank defined by a cylindrical side wall, a top wall and a dome-shaped bottom wall. A cold water inlet is disposed for releasing cold water under pressure in a lower portion of the tank. Two or more resistive heating elements heat water in a respective one of an upper and lower region of the tank. Temperature sensing means is provided for sensing water temperature in the upper and lower regions of said tank. Control means actuates at least one of the two or more resistive heating elements when the water temperature in at least one of the tank regions falls below a set point temperature value as sensed by the sensing means. The dome-shaped bottom wall has a surrounding cavitated zone thereabout where water temperature is at its lowest and water is less agitated and more prone to bacteria proliferation. Convection means is provided to cause heated water from the tank to be released in the lower region of the tank in the immediate area of the dome-shaped bottom wall and he surrounding bacteria proliferation zone at a temperature sufficient to kill and prevent bacteria proliferation.

According to the broad aspect mentioned above, the convection means is constituted by a water pump having an inlet conduit extending into the upper region of the tank where water is at a high temperature. The water pump has an outlet conduit connected thereto which has a discharge end disposed to release hot water from the upper region of the tank into the lower region in the immediate area of the dome-shaped bottom wall and into a cavitated zone to raise the water temperature therein.

According to the broad aspect mentioned above, the convection means is constituted by an inverted shallow cone-shaped baffle plate having an outer circular peripheral edge. The baffle plate is retained in the lower region of the tank and houses a substantial portion of a lower one of the resistive heating elements extending in the tank lower region. The resistive heating element is disposed in a chamber integrally formed along a top end section of the cone-shaped baffle plate and in communication with the space under the baffle plate immediately above the dome-shaped bottom wall. The chamber has an elongated slot opening for releasing hot water from under the baffle plate heated by the resistive heating element and causing hot water to flow under the baffle plate against the bottom wall.

According to a still further broad aspect of the present invention, there is provided a method of preventing bacterial growth in a bottom end of a water holding tank of an electric water heater in the region of a dome-shaped bottom wall defining a cavitated zone thereabout. The method comprises the step of convecting heated water from above the dome-shaped bottom wall to the immediate area of the dome-shaped bottom wall and into the cavitated zone to maintain the temperature of water in the cavitated zone at a temperature sufficient to prevent harmful bacteria growth.

According to a further broad aspect of the invention, the method further comprises before the step of convection, sensing water temperature in the immediate area of the dome-shaped bottom wall, and after the step of convection, controlling the duration of the step of convection in relation to the sensed temperature to maintain water temperature sufficiently high to prevent bacteria growth.

DESCRIPTION OF THE DRAWINGS

A preferred embodiment of the present invention will now be described with reference to the examples of the preferred embodiment wherein.

DESCRIPTION OF THE PREFERRED EMBODIMENT OF THE INVENTION

Figure 1:
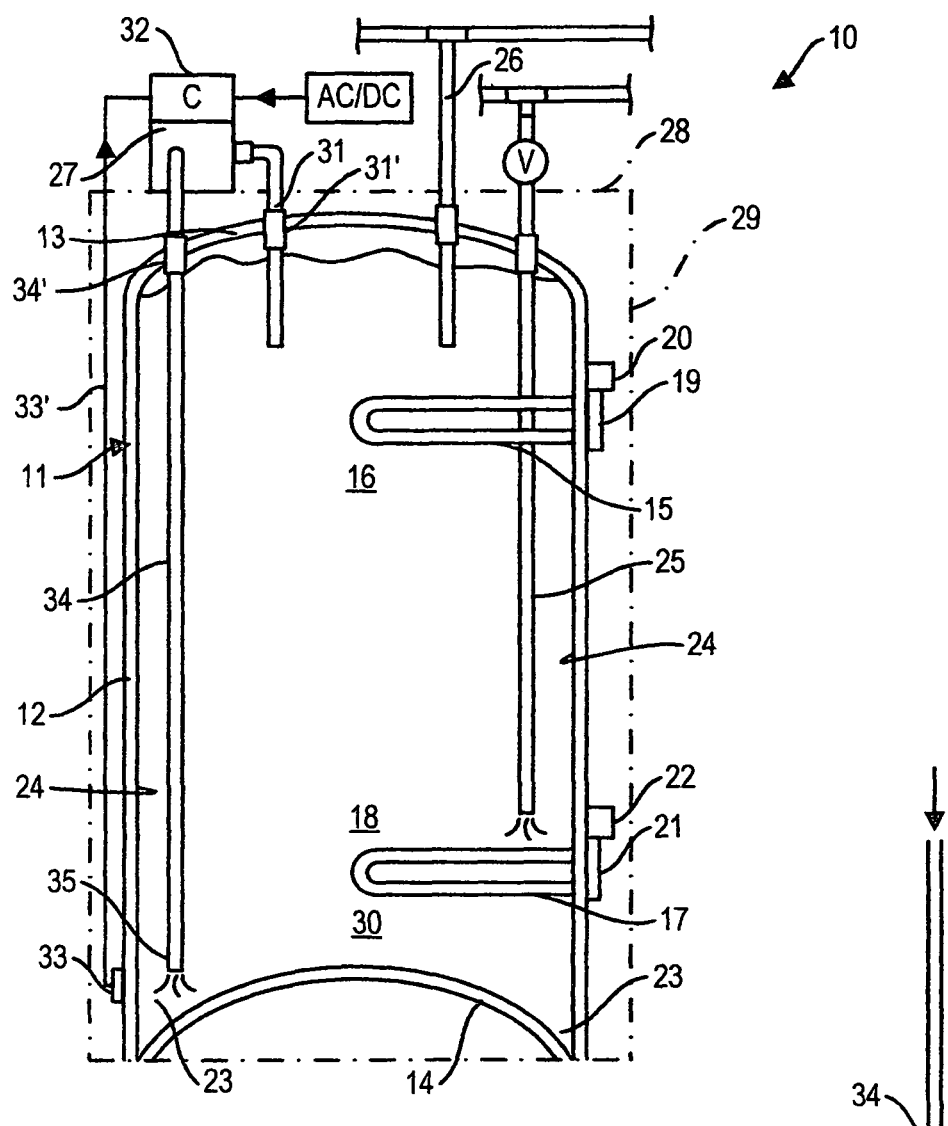
FIG. 1 is a simplified section view of an electric water heater showing some of the components thereof and illustrating one example of the preferred embodiment wherein the convection means is a water pump which displaces hot water from the top region of the tank to the lower region thereof closely spaced to the dome-shaped bottom wall of the tank.
Figures 2, 3:
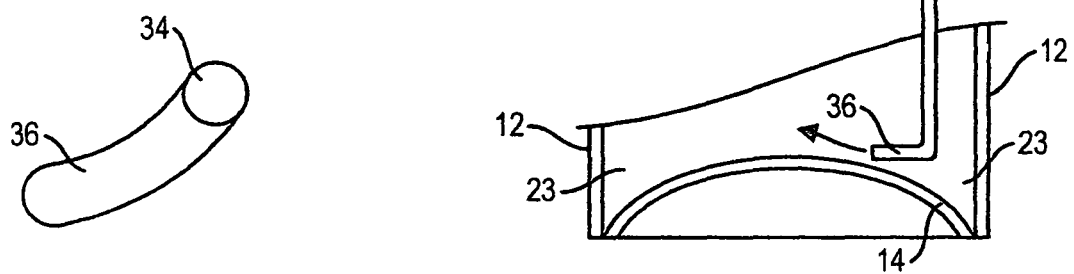
FIG. 2 is a fragmented side view illustrating a modification to the outlet conduit of the pump and its relation to the dome-shaped bottom wall.
FIG. 3 is a top view illustrating the modification to the bottom end section of the outlet conduit of FIG. 2.

Referring to the drawings and more particularly to FIGS. 1 to 3, there is shown generally at 10 an electric water heater which is comprised of a water holding steel tank 11 formed by a surrounding side wall 12, a top wall 13 and a dome-shaped bottom wall 14. A resistive heating element 15 is mounted to the tank side wall and projects in an upper region 16 of the tank 12. A bottom resistive heating element 17 is also mounted to the tank wall 14 and projects into a lower region 18 of the tank spaced above the bottom wall 14. A control thermistor 19 is equipped with a temperature sensor 20 and operates the resistive heating element 15 to maintain a set temperature value in the upper region 16 of the tank. Similarly, a control thermistor 21 and temperature sensor 22 control the lower resistive heating element 17 and set at the same temperature as the upper element. Typically, during ordinary operating conditions the consumption temperature of the water in the tank 11 is at 60 degrees C.

As previously described, the *Legionella* bacteria can survive in stagnant water at temperatures of 20 to 45 degrees C. but above these temperatures the bacteria is destroyed. Because the tank bottom wall 14 is formed as a dome, it defines a surrounding cavitated zone 23 about the dome adjacent the tank side wall inner surface 24 wherein sediments in the water can build up as the water therein is less agitated by the movement of water in the tank as the water is heated and rises in the tank and also by the draw of cold water into the tank through the dip tube 25 bottom end, space well above the bottom wall, as hot water is removed from the upper region 16 through the outlet pipe 26. In order to prevent the proliferation of the *Legionella* bacteria in the bottom end 30 of the tank below the lower resistive heating element 17 and particularly in the cavitated zone 23, there is provided a small water pump 27 conveniently mounted on the top wall 28 of the outer shroud 29 of the tank 11 to pump water from the upper region 16 of the tank to the bottom end 30 in close proximity to the bottom wall. The water released in the bottom end is typically in the range of between 50 degrees C. to 60 degrees C.

As shown in FIG. 1, the pump 27 has an inlet conduit 31 which extends into the upper region 16 of the tank to draw hot water therefrom when the pump is actuated by a control device 32 which is connected to a temperature sensor 33 secured against the tank side wall 11 adjacent the bottom end 30 close to the cavitated zone 23. The pump 27 also has an outlet conduit 34 in the form of a dip tube which extends within the tank 11 and has its discharge end 35 disposed in the bottom end of the tank to release hot water from the upper region to the immediate area of the bottom wall and into the cavitated zone 23 to raise the water temperature therein above 46 degrees C.

It is pointed out that the pump pressure is sufficiently low not to precipitate sediment deposits from the cavitated zone into the upper portion of the tank to prevent mixture thereof with hot water drawn from the tank as such could cause malfunction of the mixing valves of appliances connected to the hot water distribution conduits network. By positioning the outlet conduit 34 within the tank in contact with hot water therein there is substantially no heat loss of the transfer of hot water from the upper region 16 to the bottom end 30. The outlet conduit 34 is also constructed from non-oxidation material, similar to the dip tube 25 and capable of withstanding temperatures well above 60 degrees C. The conduits 31 and 34 are removably secured to the top wall 13 of the tank through suitable leak-proof bushings 31' and 34', respectively.

As shown in FIGS. 2 and 3, the outlet conduit can also be formed with a curved conduit end section 36 and oriented to cause a gentle swirling motion of the water over the dome-shaped bottom wall 14.

Figure 4:
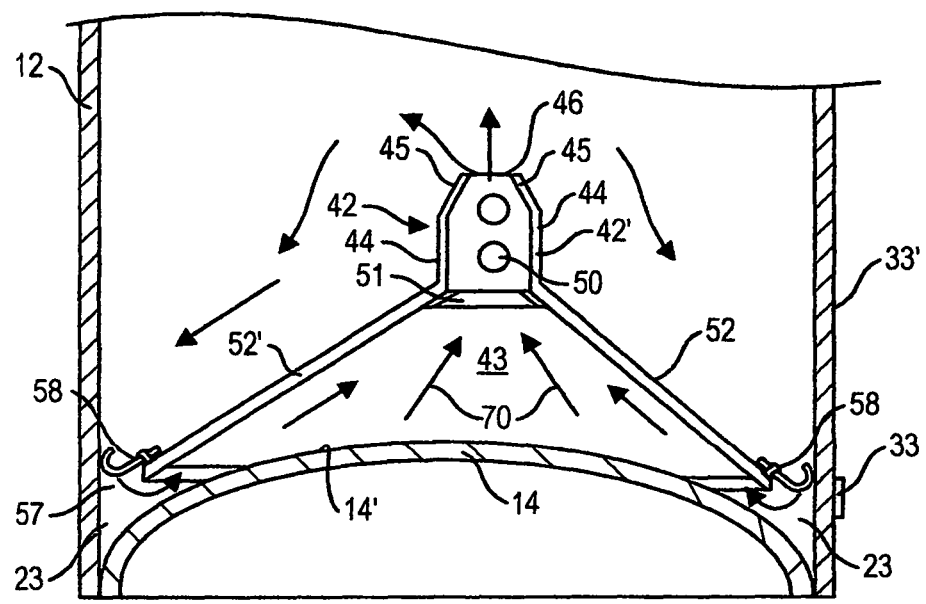
FIG. 4 is a fragmented sectional side view illustrating a further example of the convection means which is herein constituted by an inverted dome shaped baffle plate housing a lowermost one of the resistive heating elements to create a hot water flow in the immediate area of the dome-shaped bottom wall of the tank.
Figure 5:
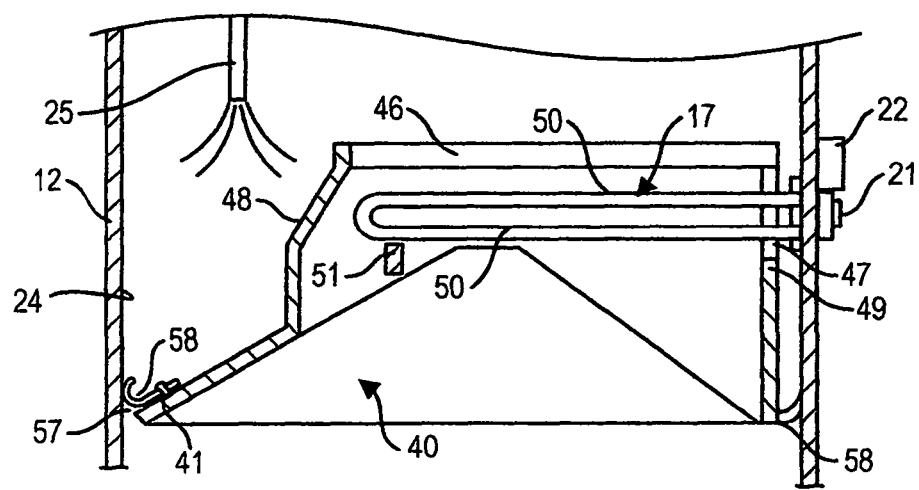
FIG. 5 is a fragmented sectional side view, similar to FIG. 4, but providing a transverse view of the inverted dome shaped baffle plate as shown in FIG. 4 and the lowermost resistive heating element.
Figure 6:
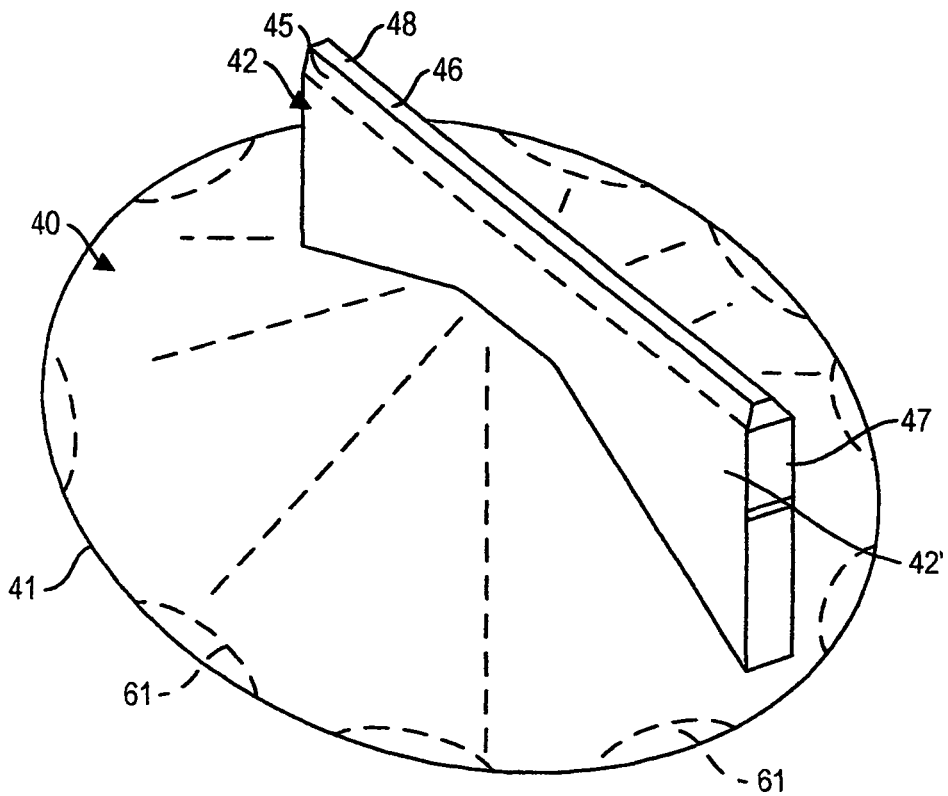
FIG. 6 is a top perspective view of an example of the construction of the inverted dome shaped baffle plate.
Figure 7:
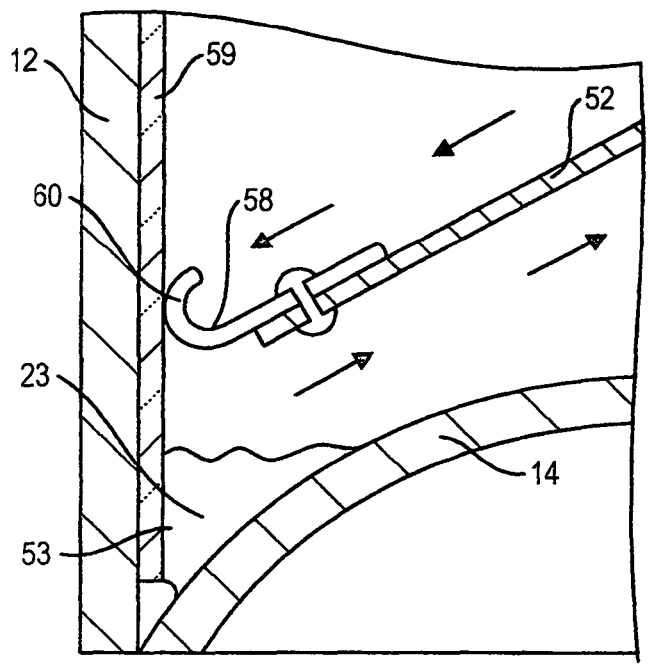
FIG. 7 is a fragmented section view showing the position of the outer peripheral edge of the inverted dome shape baffle plate and its relation to the side wall of the tank and the cavitated peripheral zone of the dome-shaped bottom wall of the tank and further illustrating one of the spacer clips secured to the peripheral edge of the baffle plate to center the inverted dome shape baffle plate with respect to the circular side wall of the tank.

With reference now to FIGS. 4 to 7, there is illustrated another example of the preferred embodiment wherein the convection means is constituted by an inverted shallow cone shape baffle plate 40, as shown in perspective view in FIG. 6. The baffle plate 40 has an outer peripheral edge 41 and is of circular contour whereby to be retained in the lower region or bottom end 30 of the tank and closely spaced to the inner surface 24 of the tank sidewall 12. A resistive heating element chamber 42 is formed in the upper region of the baffle plate for housing the lower resistive heating element 17. This chamber 42 is formed as an open-ended channel 42' which is in communication with the space 43 under the baffle plate 40 and above the dome-shaped bottom wall 14.

The open-ended channel 42' has opposed parallel side walls 44 each of which has an inwardly inclined top section 45 to define therebetween and elongated slot opening 46. The channel 42' has a rear open end 47 and a closed upwardly slopped front end 48. The lower resistive heating element 17 is received in the channel 42' through the open end 47 and spaced from the side walls 44. The arms 50 of the resistive heating element 17 may be disposed in a vertical plane, as illustrated, or at any angle in the channel 42', depending on the type of resistive heating element.

As illustrated, the diameter of the baffle plate 40 is slightly smaller than the inner diameter of the tank side wall 12 whereby to define a space or a circumferential passage 57 between the outer peripheral edge 41 of the baffle plate 40 and the inner surface 24 of the tank side wall 12. In order to ensure that the baffle plate 40 is centered with the inner diameter of the tank inner side wall 24, spacer members 58, as shown in FIGS. 4 and 5, are secured spaced apart about an outer peripheral section of the inverted cone shape baffle plate 40 and project beyond the outer circular peripheral edge 41 for frictional engagement with the inner surface 24 of the tank side wall 12. Because the inner surface 24 of the tank side wall 12 is coated with a glass lining 59, the spacer members 58 are formed with soft spring arms 60 having a curved shape for smooth resilient contact with the glass lining to prevent damage to the glass coating. They also center the baffle plate 40 with respect to the inner diameter of the tank. Of course, the baffle plate is installed and centered before the dome-shaped bottom wall is welded to the tank cylindrical side wall 12 and positioned to align the open end 47 of the channel 42' with the resistive heating element cavity. The resistive heating element 17 may be installed in the channel 42' before installation of the bottom wall. It is also pointed out that the resistive heating element 17 can be easily removed and replaced from the channel of the baffle plate.

With the baffle plate 40 secured in position, as better shown in FIGS. 4 and 5, it can be seen that the outer peripheral edge 41 of the baffle plate 40 extends spaced from the inner surface 24 of the tank side wall 12 and point in the direction of the cavity zone 23 and spaced above the top surface 14' of the dome-shaped bottom wall 14 to create the circumferential water inlet opening about the baffle plate. As soon as the lower resistive heating element 17 is provided power, it quickly heats the water surrounding it in the channel 42 causing the heated water to rise upwards through the slot opening 46 drawing water form under the inverted dome shape baffle plate 40 causing water to be drawn under the baffle plate through the circumferential passage 57 thereby drawing heated water from the surrounding area of the baffle plate mixed with hot water released through the slot opening back under the baffle plate and above the cavitated zone 23 to raise the temperature in that area well above 46 degrees C. to prevent the proliferation of the *Legionella* bacteria in this zone which may contain sediments and all the area in the bottom end 43 of the tank.

With further reference to FIGS. 4 and 5 there is shown a stop bar 51 secured under tnd across the baffle plate circumferential cone wall 52' and spaced immediately under the channel 42. The purpose of the stop bar 51 is to prevent the baffle plate 52 from being dislodged by moving upwardly beyond its efficient working position, as the stop bar 51 would abut a lower arm 50 of the resistive heating element 17. The stop bar 51 is constructed as a tin plastic bar oriented vertically to minimize obstruction to water flow moving upwards from under the bar. Also, the lower edge 49 of the entrance opening 47 of the channel 42 provides an abutment on the resistive heating element 17 should there be an upward displacement of the baffle plate 52.

With respect to both embodiments, the sensor 33 and the control 32 assures the maintenance of the high water temperature in the bottom end 30 of the tank. If there is a draw of water from the tank causing the water temperature in the tank lower end to drop by the introduction of cold replacement water through the dip tube 25, the lower resistive heating element 17 will be powered for the water in its region to attain its set point temperature of 60 degrees C. and cause heated water to be drawn under the baffle plate. However, if the water in the tank is idle for a long period of time and the water temperature in the bottom end falls below a value of say 50 degrees C., as sensed by the controller 32, the bottom element will be powered by the controller 32 receiving sensed temperature signals from its connection 33' to the temperature sensor 33, to raise the temperature in the bottom end 43.

As shown in FIG. 6, it is also conceivable that the outer peripheral edge 41 of the baffle plate be positioned in close friction fit with the tank inner surface 24 and water admitted thereunder through a series of cut-outs 61 formed spaced-apart along the outer circular peripheral edge 41 of the inverted cone shape baffle plate 40 to provide water passage in the area of the cavitated zone 23 about the dome-shaped bottom wall 14 when the resistive heating element 17 is powered.

It can be summarized that the above described examples of the preferred embodiment of the present invention provide a novel method of preventing bacteria growth in the bottom region of an electric water heater and particularly, but not exclusively, one having a dome-shaped bottom wall 14 where a cavitated zone 23 is formed about the dome-shaped bottom wall. Briefly described, the method comprises the steps of sensing water temperature by means of a sensor 33 in the immediate area of the dome-shaped bottom wall to assure that the temperature of water therein is maintained at a temperature of at least 46 degrees C. The method also provides convection means to convect heated water from above the dome-shaped bottom wall 14 into the area of the cavitated zone 23 and over the dome-shaped bottom wall 14 to maintain the water temperature above 46 degrees C. to prevent harmful bacteria growth. The method also comprises controlling the duration of the convection of hot water above 46 degrees C. in the bottom end of the tank.

The step of convecting heated water to the bottom end 30 of the tank 11 can be achieved by the use of a water pump 27 mounted at any convenient location on the tank to draw hot water from the upper region 16 of the tank where water is at a higher temperature through conduit means and releasing the hot water above the dome-shaped bottom wall 14 and into the area or region of the cavitated zone 23 to raise the water temperature therein above 46 degrees C. and at a water pump pressure sufficiently low to prevent precipitation of sediment deposits into the upper region of the tank where water is drawn.

The step of convecting may also be achieved, as described herein, by mounting an inverted shallow cone shape baffle plate under the lower resistive heating element 17 and spaced above the dome-shaped bottom wall 14 a predetermined distance therefrom to direct heated water generated by the lower resistive heating element to be partially convected back into the area of the cavitated zone 24 and over the dome-shaped bottom wall 14 to raise the temperature in the bottom end 30 of the tank above 46 degrees C. A temperature sensor 33 and a suitable control 32 assures the operation of the lower resistive heating element to maintain such temperature to prevent bacteria growth in the tank bottom end.

It is within the ambit of the present invention to cover any obvious modifications of the preferred embodiment described herein provided such modifications fall within the scope of the appended claims.

The invention claimed is:

1. A method of preventing bacterial growth in a bottom end of a water holding tank of an electric water heater wherein said bottom end has a dome-shaped bottom wall defining a cavitated zone thereabout, said method comprising the steps of:
   (i) sensing water temperature at said bottom end of said water holding tank,
   (ii) convecting heated water from above said dome-shaped bottom wall, where said heated water is at a temperature sufficient to prevent *Legionella* bacteria growth, and into said bottom end of said water holding tank and said cavitated zone to maintain the temperature of water in said bottom end of said water holding tank and said cavitated zone at said temperature sufficient to prevent *Legionella* bacteria growth, and wherein said step (ii) of convecting comprises pumping said heated water from said upper region of said tank where water is at a high temperature of at least 46 degrees C. by the use of a pump through conduit means and releasing said water at said high temperature of at least 46 degrees C. in a spiral motion in the immediate area of said dome-shaped bottom wall and said cavitated zone to prevent water temperature stratification in said lower region of said tank and to raise the water temperature to at least 46 degrees C. to kill said *Legionella* bacteria, and
   (iii) controlling a duration of said step of convecting in relation to said sensed temperature to maintain water temperature preventing said *Legionella* bacteria growth.

2. The method as claimed in claim 1 wherein said water holding tank has a cylindrical side wall, a top wall and said dome-shaped bottom wall; a cold water inlet disposed for releasing cold water under pressure in a lower portion of said tank above said dome-shaped bottom wall, two or more resistive heating elements to heat water in an upper and lower region of said tank, temperature sensing means for sensing water temperature in said upper and lower regions of said tank, and control means to actuate at least one of said two or more resistive heating elements when said water temperature in at least one of said regions falls below a set point temperature value as sensed by said sensing means.

3. A method of preventing bacterial growth in a bottom end of a water holding tank of an electric water heater wherein said bottom end has a dome-shaped bottom wall defining a cavitated zone thereabout, said water holding tank having a cylindrical side wall, a top wall and said dome-shaped bottom wall; a cold water inlet disposed for releasing cold water under pressure in a lower portion of said tank above said dome-shaped bottom wall, two or more resistive heating elements to heat water in an upper and lower region of said tank, temperature sensing means for sensing water temperature in said upper and lower regions of said tank, control means to actuate at least one of said two or more resistive heating elements when said water temperature in at least one of said regions falls below a set point temperature value as sensed by said sensing means, said method comprising the steps of:
   (i) sensing water temperature at said bottom end of said water holding tank,
   (ii) convecting heated water from above said dome-shaped bottom wall where said heated water is at a temperature sufficient to prevent *Legionella* bacteria growth, and into said bottom end of said water holding tank and said cavitated zone to maintain the temperature of water in said bottom end of said water holding tank and said cavitated zone at said temperature sufficient to prevent *Legionella* bacteria growth, and
   (iii) controlling a duration of said step of convecting in relation to said sensed temperature to maintain water temperature preventing said *Legionella* bacteria growth, and further wherein said water holding tank has a cylindrical side wall, a top wall and said dome-shaped bottom wall; a cold water inlet disposed for releasing cold water under pressure in a lower portion of said tank above said dome-shaped bottom wall, two or more resistive heating elements to heat water in an upper and lower region of said tank, temperature sensing means for sensing water temperature in said upper and lower regions of said tank, control means to actuate at least one of said two or more resistive heating elements when said water temperature in at least one of said regions falls below a set point temperature value as sensed by said sensing means.

* * * * *